April 29, 1969

M. COCCELLATO 3,440,684

CLAM OPENING DEVICE

Filed Oct. 6, 1966

INVENTOR
Marco Coccellato

BY Clive H Bramson

ATTORNEY

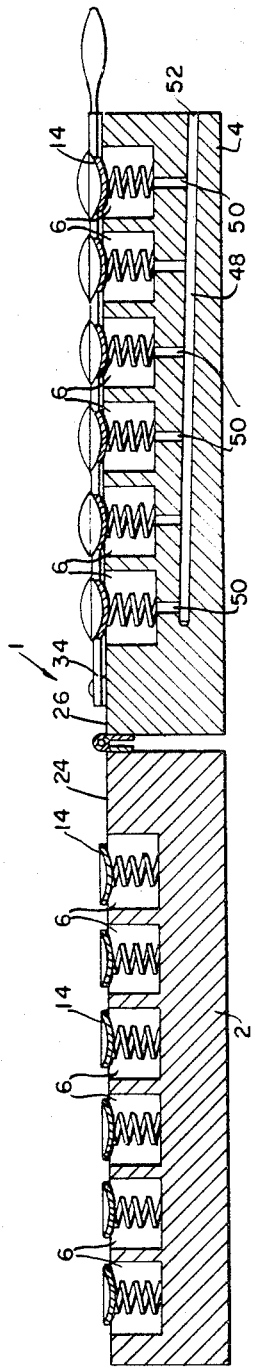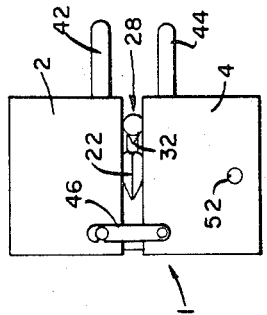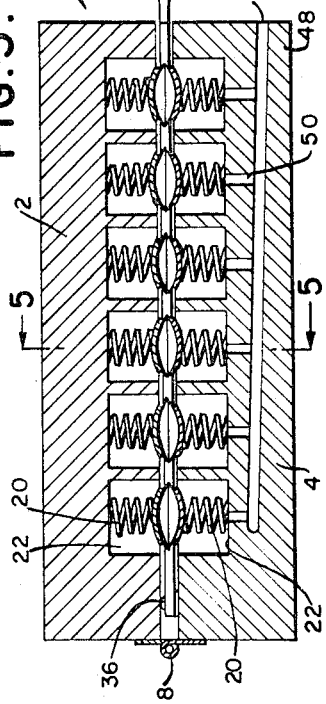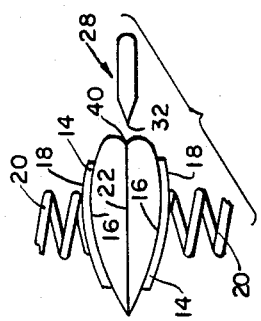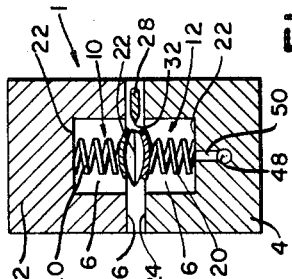

INVENTOR
Marco Coccellato

BY *Clive H. Bramson*

ATTORNEY

United States Patent Office 3,440,684
Patented Apr. 29, 1969

3,440,684
CLAM OPENING DEVICE
Marco Coccellato, Syosset, N.Y., assignor of thirty-five percent to William Quaranta, Syosset, N.Y.
Filed Oct. 6, 1966, Ser. No. 584,847
Int. Cl. A22c *29/00*
U.S. Cl. 17—76                                       7 Claims

ABSTRACT OF THE DISCLOSURE

A clam opening device made up of an upper and lower support with a recess therein having a clam holding means yieldingly mounted in the recess adapted to secure a clam therebetween and a knife mounted for relative movement with respect to the support members for shucking the clam.

---

This invention relates generally to clam opening devices and more particularly to a device for shucking clams including means for automatically levelling the clam whereby the separation plane of the valves of the clam is rendered coplaner with respect to the predetermined plane through which the cutting edge of a clam splitting instrument passes.

Whereas clam shucking devices taught by the prior art require extensive manual manipulation and placement of the clams preparatory to the opening operation and utilize cutting or splitting means incapable of accurately aligning with and penetrating between the valves of the clam, the clam opening operation has, heretofore, been a tedious and time consuming operation. The present invention, however, obviates such difficulties by providing means whereby clams of various sizes are automatically oriented with respect to the plane of movement of the clam splitting means and further whereby a plurality of clams may be expeditiously opened in a single operation.

Accordingly, and consonant with the foregoing, the instant invention has for an object the provision of a clam opening device including novel means for holding a clam in preparation to the splitting thereof.

Another object of the present invention is to provide a device of the foregoing character which comprises clam splitting means of novel construction and which is unexpectedly advantageous in use.

A further object of this invention resides in the provision of a clam opening device which, by virtue of its combination of features is equally applicable to the end of opening one or a plurality of clams in a single operation.

Another object of the present invention is to provide a device in accordance with the foregoing which includes means for collecting the juice of the clams as the clams are opened.

Still another object of the instant invention is to provide a clam opening device capable of various general configurations and which can be manual in operation or actuated by a powered driving means.

Another general object of the present invention is to provide a device of the described character which will be simple in structure, economical of manufacture, easily and quickly installed and highly effective in use.

Other objects and advantages of the instant clam opening device will be set forth in part hereinafter and in part will be obvious herefrom, or may be learned by practice of the invention, the same being realized and attained by means of the structure defined and pointed out in the appended claims.

The accompanying drawings referred to herein and constituting a part hereof, illustrate embodiments of the invention, and together with the description, serve to explain the principles thereof.

FIGURE 3 is a side elevational cross sectional view of the device of FIGURE 1 illustrating pre-opened clams seated upon respective clam-valve-forms;

FIGURE 4 is a side elevational cross sectional view of the device in closed position in preparation for movement of the clam splitting knife through the separation plane of the clams shown therein;

FIGURE 5 is a view taken along line 5—5 of FIGURE 4;

FIGURE 6 is an end view of the device illustrating the means for locking the support members in superposed relation;

FIGURE 7 is an enlarged fragmentary view of the clam holding means and the relative arrangement of the clam splitting knife and the nerve of the clam whereby penetration of the latter is utilized herein to facilitate the clam opening procedure;

Figure 1:
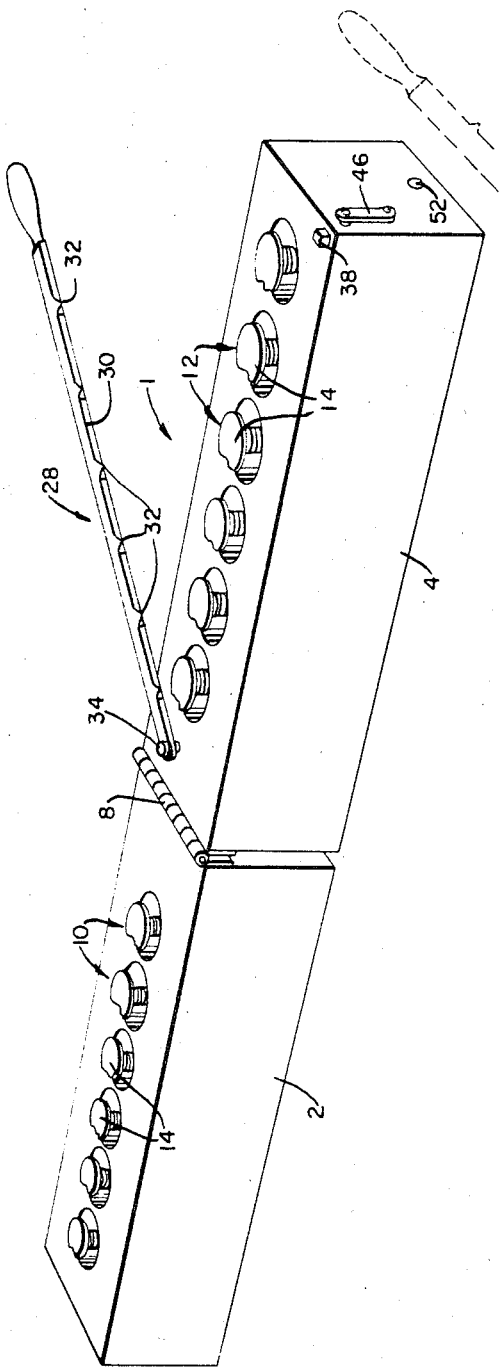
FIGURE 1 is a perspective view of the clam opening device including a pair of hingedly arranged support members and adapted for opening a plurality of clams in a single operation.

Referring now in detail to the embodiment of the invention illustrated in the accompanying drawings, FIGURES 1–6 show the clam opening device designated generally by numeral 1 in the various positions as heretofore described.

More specifically, the clam opening device comprises a pair of support members 2 and 4 of generally rectangular cross section, it being understood, however, that said members may be of any suitable shape. Recessed regions 6 are similarly provided in each of said members as shown, hinge 8 being included between said support members whereby the latter can be swung into opposing relation as shown in FIGURES 4 and 5, said recessed regions being then opposingly faced as shown.

Clam holding members, generally designated by numerals 10 and 12, are yieldingly mounted within recessed regions 6 of support members 2 and 4, respectively, pairs of said clam holding members being adapted to coact for securing a clam between each pair thereof as shown. More specifically, each clam holding member is comprised of a claim-valve-form 14 which is contoured to the form of an empty shell or valve of the clam itself. Thus, each clam-valve-form has a concave obverse surface 16 and a convex reverse surface 18, said concave surfaces providing opposing seat for a clam placed therebetween as shown, e.g., in FIGURE 7 of the drawings. Reverse surface 18, it will be appreciated, may be of any suitable shape, there being no criticality with respect thereto.

To the end of retaining said clam-valve-forms within respective recesses as shown in the drawings, a spring 20 is secured at one end to the reverse surface of each valve-form, the other end thereof being secured at the bottom 22 of each recess. The spring need not be coiled as the spring shown in the drawings but may be of any suitable type and material and may further be secured within said recess or placed therein in any suitable manner. Spring 20 particularly functions to establish the aforesaid yieldable mount of each clam-valve-form within the recess whereby a clam seated between opposing valve-forms will automatically become oriented as it adjusts to the contour of the valve-forms, such adjustment being effective to level the clam whereby the separation plane between the valves of the clam becomes parallel with respect to surfaces 24 and 26 and substantially equidistant with respect to said surfaces. Such automatic adjustment is occasioned in view of the equal length and biasing characteristics of each pair of opposing springs 20. Further, the automatic leveling action of the clams seated between respective pairs of clam holding means 10 and 12, is afforded by the smoothness of the concave obverse surfaces of said clam-valve-forms, such smoothness permitting a slidable relation between the clam and said surfaces whereby sliding continues until the level attitude of the clam occurs. Such leveling occurs rather quickly once the clam is compressingly seated between respective clam-valve-forms 14.

Clam splitting means or knife, generally designated by numeral 28, is comprised of a cutting edge 30 and a plurality of pointed portions 32, one pointed portion being required for each of said coacting clam-holding-means 10, 12. Said knife 28, is as shown pivotally mounted at 34 upon support member 4 whereby when said support members 2 and 4 are arranged in superposed locked position as shown in FIGURES 4-6 of the drawings, said cutting edge and pointed portions of said knife will, when manually moved into clam-splitting position, pass equidistantly between said support members and therefore directly into the separation plane 22 of the clam as illustrated in FIGURE 7. It will be appreciated that said support members, when in the aforesaid operative superposed position, will be spaced as shown, pivot pin 36 and spacer 38 being effective in establishing the desired distance between surfaces 24 and 26 when support members 2 and 4 are in the superposed position.

Figure 2:
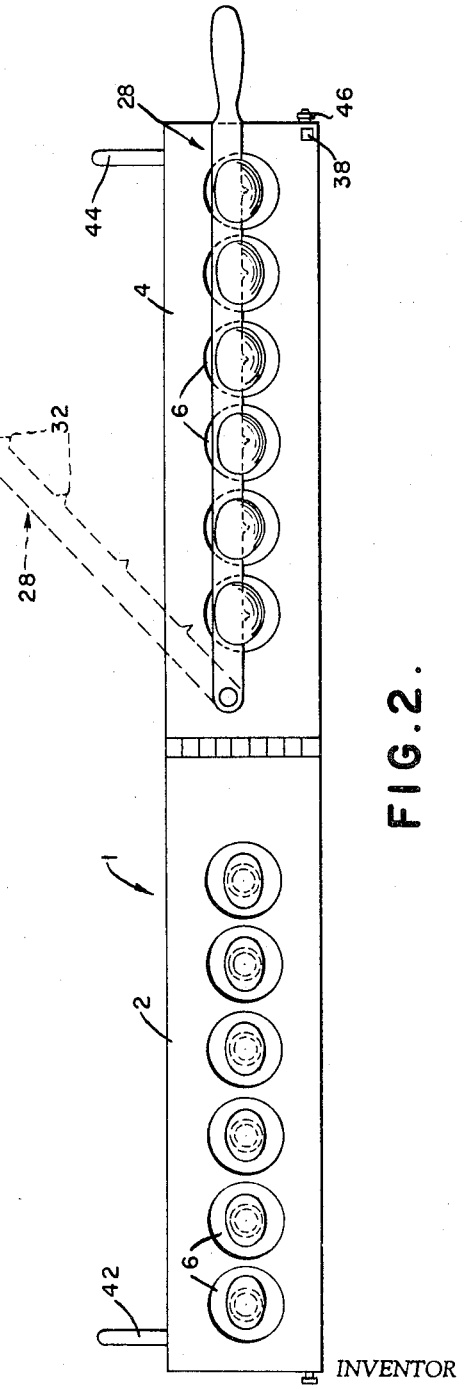
FIGURE 2 is a top plan view of the device illustrating the path of movement of the clam splitting knife and the relative alignment of the pointed portions of said knife with respect to the clam holding elements.

In operation, clams are placed upon the clam-valve-forms 14, the clams being arranged so that their contour complements the contour of the respective valve-forms, the latter being prearranged whereby when the clams are placed as described, the nerve 40 of each clam which is located intermediate the separation plane 22 thereof, being then oriented so that pointed portions 32 of the clam splitting knife will penetrate directly into said nerves when the knife is moved into the solid line position shown in FIGURE 2 of the drawings.

Previous to moving the knife into clam splitting position, however, handles 42 and 44 are used to compress the upper and lower support means 2 and 4 whereby the clams will slide within respective clam-valve-forms and become oriented or leveled as aforedescribed. Hook locking member 46 is then utilized to secure said support members in operative superposed relation as shown in FIGURE 6 and then knife 28 is pivoted into passing relation with respect to separation planes 22 of the clams.

Passage 48 is provided as a conduit for clam juice as the latter is deposited in recessed regions 6 as a result of the clam-splitting operation. Manifold passages 50, as shown, provide communication between each said recessed portion and passage 48 and thence to outlet orifice 52. Accordingly, the exuding clam juice can be conveniently collected. Filter means can, of course, be provided within said passage 48 and/or passages 50 to preclude clam chippings or other debris from entering the ultimately collected clam juice.

Figure 8:
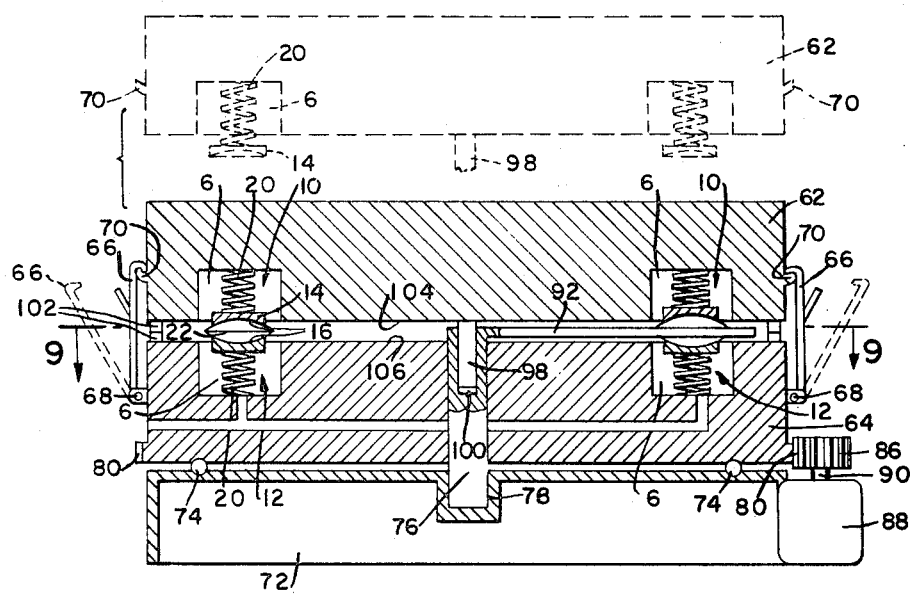
FIGURE 8 is a side elevational cross sectional view of an alternate embodiment of the device wherein the support members are of circular configuration, rotation thereof being effectuated by electrically powered motor means.
Figure 9:
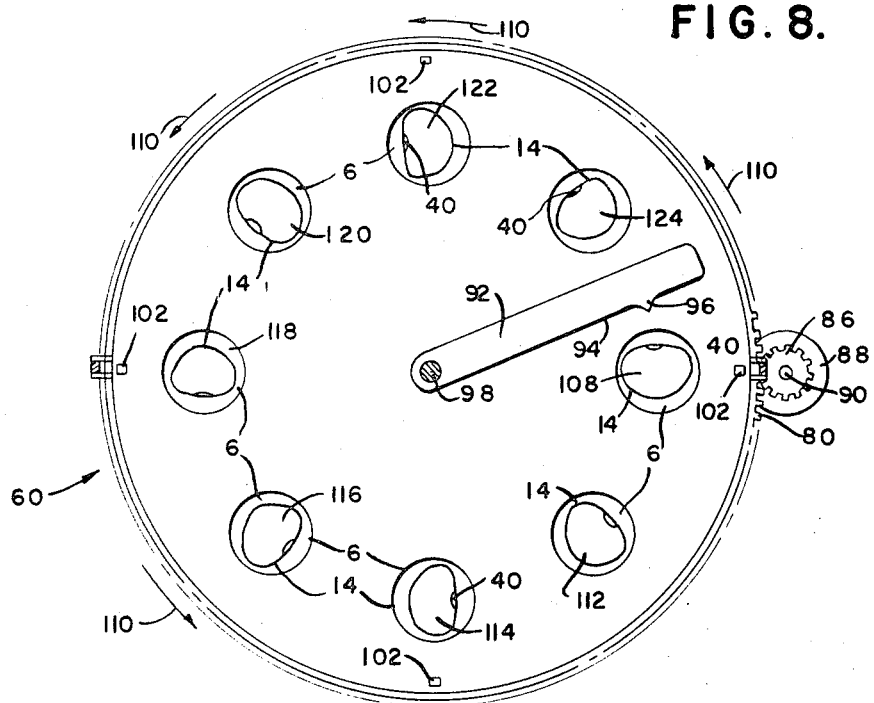
FIGURE 9 is a view taken along line 9—9 of FIGURE 8.

In the modified embodiment shown in FIGURES 8 and 9 of the drawings, the clam opening device generally designated by numeral 60 is comprised of upper and lower support members 62 and 64, respectively, said members being removably connected by clip members 66 which pivot at points 68 from member 64 and hook upon catches 70 provided upon member 62. As particularly shown in FIGURE 8, support member 64 is mounted upon base member 72, ball bearings 74 being provided to facilitate rotation of said member 64 about post 76, said post being fixedly secured to said base member within bore 78 thereof.

Gear teeth 80 are annularly arranged with respect to said support member 64 whereby drive gear 86 when rotatably driven by electric motor 88, through shaft 90, will cause said support member 64 to rotate, said support member 62, when connected by clip members 66 to support member 64, being, therefore, adapted to rotate in unison therewith.

Clam splitting knife 92 which is fixedly mounted to post 76 which in turn is fixedly secured to base 72 as described herein, remains stationary with respect to support members 62 and 64 as the latter unitedly rotate.

As will be seen in FIGURES 8 and 9 of the drawings, numerals similar to those used in FIGURES 1-7 to describe the clam holding members, recessed portions, clam-valve-forms, and springs are also utilized. The essential difference, however, between the arrangement of the clam holding members of FIGURES 1-7 and FIGURES 8 and 9, resides in the spaced linear and spaced circular arrangements thereof, respectively. The mode of operation of the clam holding members and the coaction therebetween is the same although in the circularly arranged embodiment said clam holding members rotate and the clam splitting knife remains stationary, the relative motion of said knife and clam holding members being, however, inconsequential as to operative advantages of the latter.

Thus, as shown in FIGURE 9, the clam splitting knife is provided with a cutting edge 94 and a single pointed portion 96, one of the latter being, obviously, all that is required.

In operation, after the clams to be opened are placed upon respective clam-valve-forms 14 whereby the shape of the clams complement the concave surface of the valve-forms, upper support member 62 is lowered upon lower support member 64, central alignment stud 98 being deposited within bore 100 of post 76. Spacers 102 function as shown, whereby the separation plane 22 will become coplaner with the plane of said cutting edge 94 of knife 92 once the position of the clam becomes leveled and equalized between surfaces 104 and 106 of said respective upper and lower support members. Clip members 66 are secured to respective catch members 70 and electric motor 88 is energized. Upon rotation of said united support members, the pointed portion 96 of stationary knife 92 first penetrates nerve 40 of the clam designated by numeral 108 as said members rotate counterclockwise as indicated by arrows 110. The valves of said clam 108 are then parted along the separation plane thereof and clams 112, 114, 116, 120, 122 and 124, in that order, are opened in a similar manner.

It will be appreciated that passage means and manifold passage means (not shown) may be arranged communicably with respect to each of said circularly arranged recessed regions 6 in the lower support member 64, whereby the exuding clam juice can be collected in the manner described with respect to the first hereindescribed embodiment. It will be further appreciated that drive means other than an electric motor are contemplated, it being further considered that manually operated crank means, e.g., can also be employed to rotate said united support members with respect to clam splitting knife 92.

What is claimed is:

1. A clam opening device comprising a pair of support members, each said support member including recess means therein, said members being movable into opposing relation whereby said respective recess means are opposingly faced, first and second clam holding means yieldingly mounted within respective recess means, said first and second clam holding means being adapted to coact for securing a clam therebetween, said support members being removably connected and mounted for united rotation, means engaging one of said members for rotating said connected members, and clam splitting means mounted with respect to said support members with a cutting edge lying substantially in the separation plane of the valves of a clam secured between said clam holding means whereby said splitting means will act to split said clam as said members are rotated.

2. A clam opening device as set forth in claim 1 including locking means for connecting said members and wherein said rotating means is an electric motor.

3. A clam opening device as set forth in claim 1 including a plurality of recess means and respective clam holding means and wherein said recess means are arranged in spaced circular relation.

4. A clam opening device as set forth in claim 1 wherein said cutting edge includes a pointed portion projecting laterally therefrom, said pointed portion being adapted to pass through a clam held between each of said clam holding means as said support members rotate in unison with respect to said clam splitting means.

5. A clam opening device as set forth in claim 1 including electrically operated drive means in driving engagement with one of said support members.

6. A clam opening device as set forth in claim 1 including passage means communicably connecting said recess means of a support member.

7. A clam opening device as set forth in claim 1 wherein spring means is disposed between the reverse surface of a clam holding means and the recess in which it is mounted.

References Cited

UNITED STATES PATENTS

| | | | |
|---|---|---|---|
| 1,679,787 | 8/1928 | Schermer | 17—9 |
| 2,691,794 | 10/1954 | Gonyea | 17—9 |
| 2,747,220 | 5/1956 | Thompson | 17—9 |
| 3,128,496 | 4/1964 | Bertrand | 17—9 |

FOREIGN PATENTS

| | | |
|---|---|---|
| 152,160 | 11/1882 | France. |
| 1,348,711 | 12/1963 | France. |

LUCIE H. LAUDENSLAGER, *Primary Examiner.*

U.S. Cl. X.R.

146—72